(12) United States Patent
Dobler et al.

(10) Patent No.: US 6,474,698 B2
(45) Date of Patent: Nov. 5, 2002

(54) CONNECTION PIECE FOR A HEAT EXCHANGER

(75) Inventors: Helmut Dobler, Hemmingen; Armin Rau, Moeglingen, both of (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/727,783

(22) Filed: Dec. 4, 2000

(65) Prior Publication Data

US 2001/0002754 A1 Jun. 7, 2001

(30) Foreign Application Priority Data

Dec. 2, 1999 (DE) .......................................... 199 57 946

(51) Int. Cl.[7] .............................................. F16L 39/00
(52) U.S. Cl. ................. 285/321; 285/288.1; 285/286.1; 285/137.11; 285/136.1
(58) Field of Search ........................ 285/136.1, 137.11, 285/345, 321, 288.1, 288.5, 288.6, 286.1, 201, 141.1

(56) References Cited

U.S. PATENT DOCUMENTS

| 5,368,340 A | * | 11/1994 | Jacobson et al. | ........ 285/136.1 |
| 5,984,370 A | * | 11/1999 | Lewis | ...................... 285/288.1 |
| 6,220,343 B1 | * | 4/2001 | Ichiyanagi | .............. 285/137.11 |

FOREIGN PATENT DOCUMENTS

| DE | 195 43 986 | 5/1997 |
| DE | 196 48 162 | 5/1998 |
| DE | 196 21 282 | 7/1999 |

* cited by examiner

*Primary Examiner*—Lynne H. Browne
*Assistant Examiner*—Aaron M Dunwoody
(74) *Attorney, Agent, or Firm*—Foley & Lardner

(57) ABSTRACT

A metallic connection piece for an all-metal heat exchanger is capable of being used for a plastic hose coupling. The connection piece (20) has a double bead as a stop region with two integrally formed anti-twist retaining means (26, 27) that engage into axial grooves (40, 41) of a hose coupling (31) and ensure fault-free mounting.

22 Claims, 3 Drawing Sheets

CONNECTION PIECE FOR A HEAT EXCHANGER

BACKGROUND OF THE INVENTION

The invention relates to a connection piece for a heat exchanger having a metallic header tank, the connection piece being capable of being soldered or preferably brazed to the header tank.

Heat exchangers having metallic header tanks and connection pieces, that are brazed to one another, are known, primarily, as so-called nonferrous metal radiators, the coolant tanks of which consist of brass. However, as a rule, modern aluminum radiators have plastic coolant tanks, onto which the connection pieces are already integrally molded in one piece. These plastic connection pieces are connected to the coolant hoses by means of a hose coupling. A seal is provided between the coolant hose or hose coupling and the connection piece, and a retaining means is also provided. These connection pieces therefore have, to some extent, complicated shapes that, however, can usually readily be produced by injection molding. Recently, however, the plastic tanks have been displaced by metal tanks, since radiators are nowadays often produced from aluminum as so-called all-metal radiators, that is to say including the coolant tanks and the connection pieces. A problem arises when the connection between connection piece and hose coupling no longer consists of two plastic parts, but of a metallic connection piece and a conventional plastic hose coupling.

SUMMARY OF THE INVENTION

It is therefore one object of the invention to provide an improved metallic connection piece for a heat exchanger, that can be used for a plastic hose coupling.

In particular, it is an object of the invention, in the case of a metallic connection piece, to provide an anti-twist retaining means for the hose coupling.

Another object of the invention is to provide an improved connection structure for a heat exchanger having a metallic coolant tank, as well as an improved heat exchanger having a hose connection.

In accomplishing at least one of these objects, there has been provided in accordance with one aspect of the present invention a metallic connection piece for a heat exchanger having a metallic header tank, the connection piece being capable of being brazed to the header tank, wherein the connection piece comprises: a) a connecting region for the header tank; b) a stop region formed by a continuous collar; c) a retaining region formed by a groove; and d) a sealing and centering region formed by a cylindrical part that merges into a conical part, where regions a)–d) adjoin one another in the direction of the longitudinal axis of the connection piece. Preferably, the stop region comprises a double bead, and one bead has integrally formed on it at least one anti-twist retaining protrusion that projects beyond the diameter of the bead.

In accordance with another aspect of the invention, there has been provided a connection structure for a heat exchanger having a metallic header tank and adapted for accepting a hose coupled thereto, the connection structure comprising: a connection piece as outlined above; a plastic sleeve placed axially over the connection piece; a sealing ring contained between the cylindrical part of the sealing and centering region and the inside of the plastic sleeve; and a retaining strap positioned in the groove of the retaining region; wherein the plastic sleeve comprises at least one axial groove for receiving the anti-twist retaining protrusion.

According to yet another aspect of the invention, there has been provided an improved heat exchanger having a metallic coolant tank and embodying the connection structure set forth above.

Further objects, features and advantages of the present invention will become apparent from the detailed description of preferred embodiments that is set forth below, when considered together with the accompanying figures of drawing.

DETAILED DESCRIPTION OF PREFERRED EMBODIMENTS

Figures 1A, 1B:
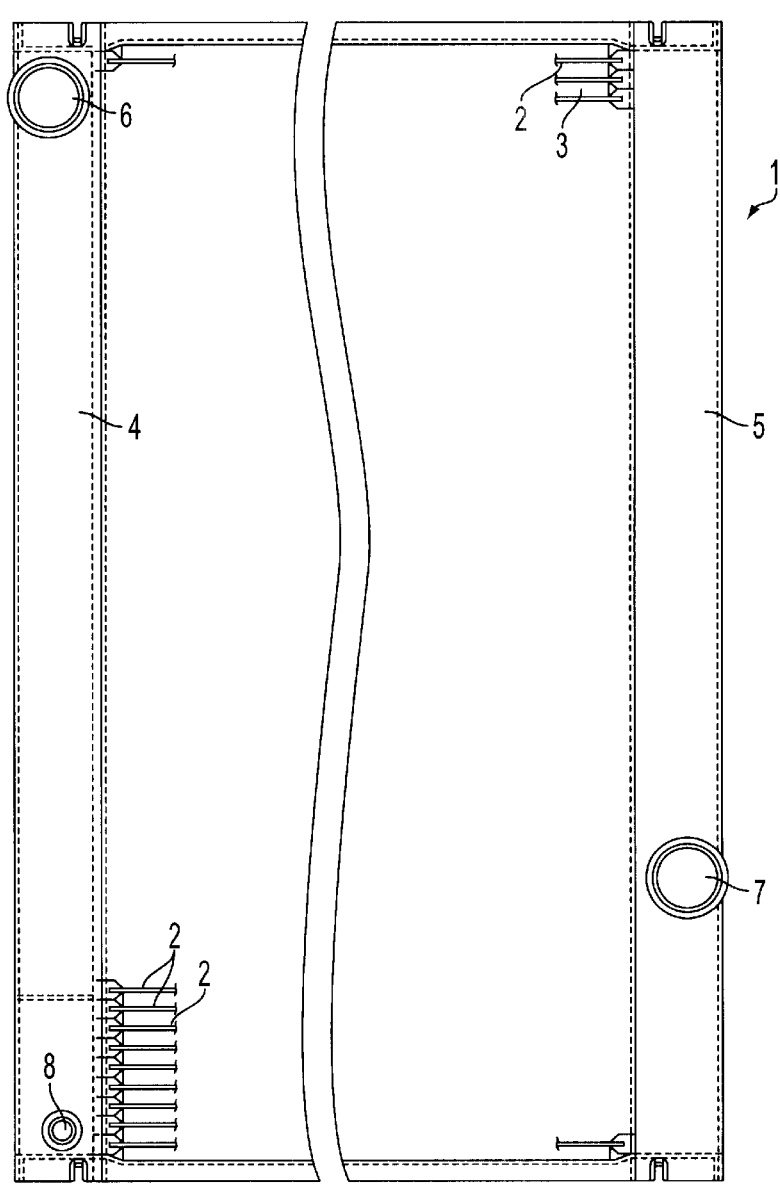
FIGS. 1(*a*), 1(*b*) and 1(*c*) show an all-metal radiator with connection pieces.

According to the invention, the connection piece has four regions that adjoin one another and ensure that a conventional hose coupling can be used for this metallic connection piece. By means of the connecting region, the connection piece is inserted into a passage in the header tank, with the collar serving as a stop, and the connection piece is brazed sealingly to the header tank. The groove-like retaining region serves for receiving a retaining clip, the sealing region serves for the bearing contact of an O-ring that is received in the coupling sleeve, and the conical region serves for centering the two parts of the coupling.

According to a first embodiment of the invention, the connection piece is produced from an aluminum tube, in which the stop region is formed by two beads. Provided on one of the two beads are anti-twist retaining protrusions that engage in a corresponding longitudinal groove of the coupling sleeve and thus prevent the coupling sleeve and the hose connected to it from being twisted. Advantageously, two tongue-like anti-twist retaining protrusions located opposite one another are of different size, thus ensuring in each case the desired mounting position, that is to say preventing twisting through 180°. In addition, a further pair of protrusions, preferably in the form of tongues, is provided for prefixing during the mounting operation. Advantageously, the tongues of each pair of tongues differ in width, so that an unequivocal mounting position is ensured.

According to a second embodiment, the connection piece is produced by extrusion, that is to say it is brought to the final shape from a solid blank as a result of deformation under the action of a high force, In this case, an anti-twist retaining protrusion in the form of one or two webs is advantageous.

According to one embodiment, the connection piece is produced from an aluminum alloy that is capable of being hard-brazed to the aluminum sheet of the header tank, with the necessary braze plating being applied preferably to the aluminum sheet of the header tank.

According to another aspect of the invention, both embodiments of the metallic connection piece can be used advantageously for a conventional hose coupling with a plastic sleeve, so that there is no need for a new hose coupling of the all-metal type.

Exemplary embodiments of the invention are illustrated in more detail in the drawing and are described in more detail below.

Figure 1C:
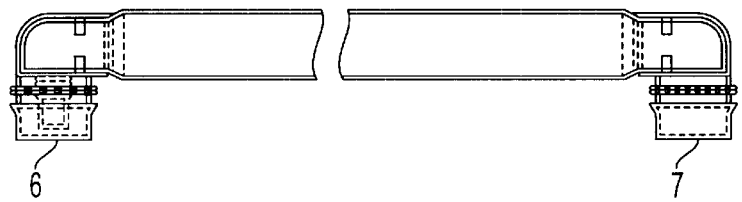

FIGS. 1(a)–1(c) show a so-called all-metal radiator that consists only of metal parts, that is to say hard-brazed aluminum parts. This radiator 1 has, in particular, a network consisting of tubes 2 and of corrugated fins 3 that are arranged between the latter and are brazed to the tubes. The flat tubes 2 are widened rectangularly on their end faces and are brazed on their longitudinal sides to one another and on their narrow sides to the coolant tanks 4 and 5. Such a radiator is known, for example, from the Applicant's DE-A 195 43 986, the disclosure of which is hereby incorporated by reference. Connection pieces 6, 7 and 8 are brazed into the coolant tanks 4 and 5.

Figure 2A:
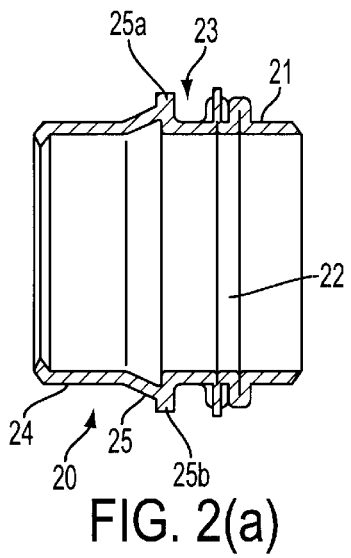
FIGS. 2(*a*), 2(*b*) and 2(*c*) show the connection piece as an individual part.
Figure 2B:
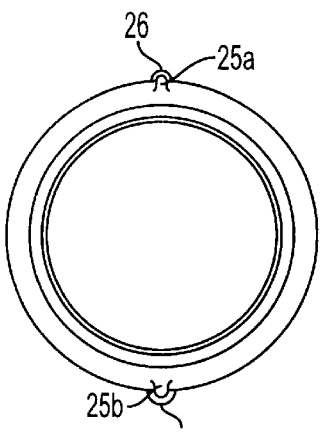
Figure 2C:
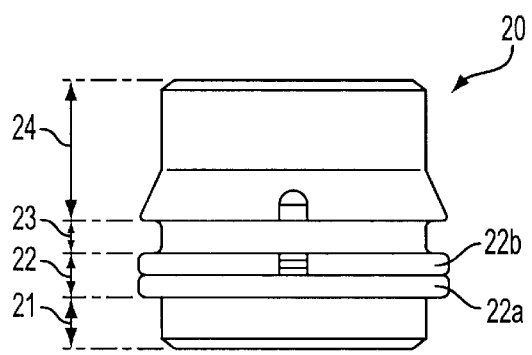

FIGS. 2(a), 2(b) and 2(c) illustrate one of these connection pieces as an individual part 20. This connection piece 20 consists of a tubular part of circular cross section and has essentially the following four portions: a first portion 21 is designed as a cylindrical connection piece that is brazed to a passage of the above-described coolant tank. A second portion 22 consists of two continuous beads 22a and 22b that rest against one another and which a third groove-like portion 23 adjoins. The fourth portion 24 is, again, of cylindrical design and is connected to the groove-like portion 23 via a centering cone having a maximum diameter 25. Integrally formed on the bead 22b facing the grooved portion 23 are two tongue-like anti-twist retaining means 26 and 27, that is to say these tongues 26, 27 located diametrically opposite one another are shaped partially out of the bead 22b by the pinching of the material. In a similar way, two further tongues 25a, 25b are integrally formed on outer edge 25 of the centering cone, specifically in alignment with the tongues 26, 27, but somewhat smaller in radial extent. These additional tongues ensure prefixing during the mounting operation. It is important that the tubular wall of the connection piece 20 is not pierced when the tongues are being shaped out, in order to ensure the necessary leaktightness. The connection piece 20 is produced as one piece from a semifinished tube by means of various forming steps. The tongues 25a, 25b, 26 and 27 project beyond the diameter of the two beads 22a and 22b as well as the centering cone outside diameter 25 and are in each case of different size. This serves for the unequivocal mounting of the coupling part, as described below.

Figure 3:
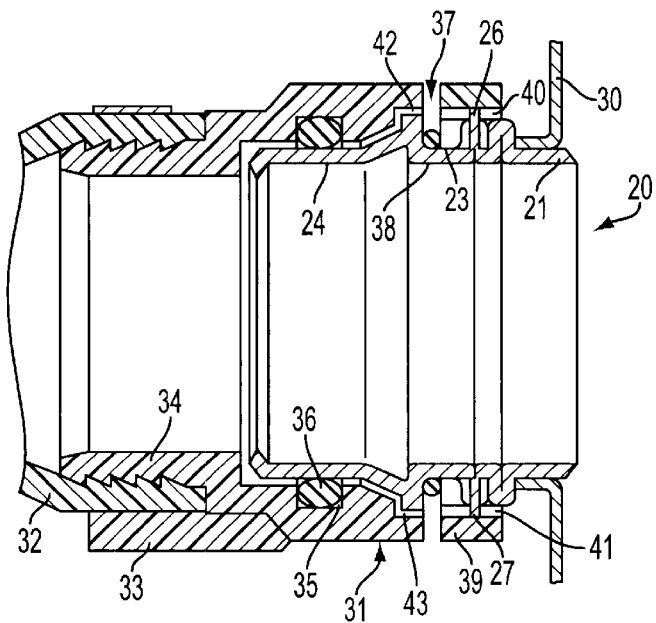
FIG. 3 shows the connection piece in conjunction with a hose coupling.

FIG. 3 shows the above-described connection piece 20 (the same reference numerals as in FIG. 2) with its connecting region 21 brazed to the coolant tank 30, partially illustrated, at one end and, at the other end connected to a hose coupling 31, onto which a coolant hose 32, partially illustrated is pressed and is connected sealingly by means of a hose clip 33. This hose coupling 31 consists of a plastic sleeve 34, known per se, which receives an O-ring 36 in an annular groove 35. The sleeve 34 has, furthermore, a slot 37 for receiving and mounting a wire-like retaining strap 38, and an end portion 39, into which are worked longitudinal grooves 40 and 41 that are located diametrically opposite one another and differ in width (as seen in the circumferential direction). This sleeve 34 is mounted together with the connection piece 20 in such a way that the O-ring 36 seals off on the portion 24 and the retaining strap 38 engages into the groove 23 and thus retains the coupling 31 with respect to the connection piece 20. Finally, the two tongues 26 and 27 engage into the axial grooves 40 and 41 and thus prevent the coupling 31 from twisting with respect to the connection piece 20. This is important particularly for the protection of the O-ring 36. The different design of the tongues 26 and 27 in conjunction with the matching grooves 40 and 41 ensures that the hose coupling 31 is in each case mounted in the same position together with the connection piece. In order to make the mounting operation easier, a further pair of tongues 25a, 25b is provided, as described above, which, during the mounting of the hose coupling 31, first engages into the axial grooves 40, 41 and thus causes a prealignment of the parts 20 and 31 as regards their position in the circumferential direction. In the end position, the pair of tongues 25a, 25b is then located in matching recesses 42, 43 of the sleeve 34. This design of the metal connection piece of an all-metal heat exchanger makes it possible to use a hose coupling known per se, produced from plastic and intended for a plastic connection piece, even for an all-metal heat exchanger.

Figure 4A:
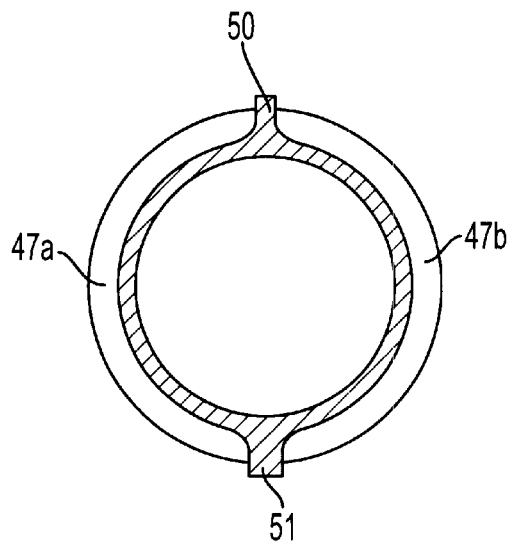
FIGS. 4(*a*), 4(*b*) and 4(*c*) show a further exemplary embodiment of a connection piece according to the invention.
Figure 4B:
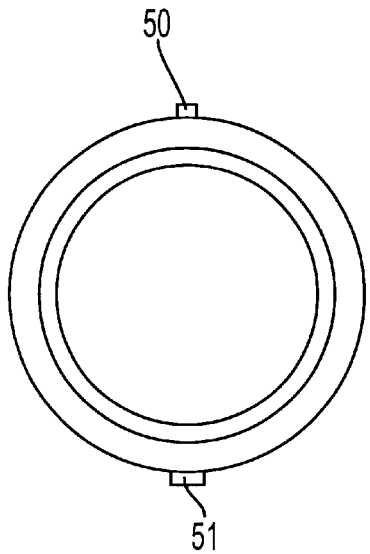
Figure 4C:
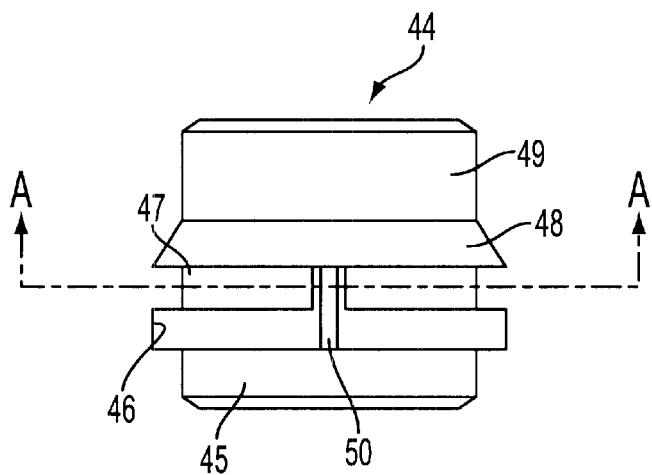

FIGS. 4(a)–4(c) show a further exemplary embodiment of a metallic connection piece 44 that is produced by extrusion from an approximately billet-like material blank essentially in one operation. This connection piece has, in a similar way to the above-described exemplary embodiment according to FIG. 2, a first connecting region 45, a continuous collar 46 as a stop, a groove-like retaining region 47, a conical centering region 48 and a cylindrical sealing region 49. The anti-twist retaining protrusion is designed, here, as a continuous web 50 that runs in the axial direction and which extends over the collar 46 and the groove 47. As is clear from FIG. 4(a), which shows a section along the line A—A, this web 50 reaches as far as the bottom of the groove 47. In a similar way, a further web 51 of somewhat larger width (as seen in the circumferential direction) is arranged on the diametrically opposite side of the web 50. The groove 47 is thus subdivided into two groove halves 47a and 47b by the two webs 50 and 51. In the mounted state, a retaining ring, corresponding to the part 38 in FIG. 3, engages into this groove half 47a, 47b. In order to achieve satisfactory leaktightness of the cylindrical region 49 by means of the O-ring, corresponding to the part 36 in FIG. 3, it is advantageous if the cylindrical surface 49, after being produced by extrusion, is additionally machined by cutting, in order to achieve as low a peak-to-valley height as possible. The aluminum alloy from which the connection piece 44 is produced by extrusion is capable of being brazed to the above-mentioned header tank, for example, by means of the so-called Nocolok™ brazing method.

Although the invention has been described with regard to the exemplary embodiments of a coolant/air radiator, it can nevertheless also readily be used for other heat exchangers, for example, for a charge-air/air radiator or for an oil/air radiator.

It is apparent to those skilled in the art that the invention can take many different forms than those preferred embodiments described above, and that various modifications can be made to the described embodiments without departing from the concept of the present invention. Therefore, it is to be understood that the appended claims are to be interpreted broadly enough to encompass all further embodiments and modifications of the present invention.

What is claimed is:

1. A metallic connection piece for a heat exchanger having a metallic header tank, the connection piece being capable of being brazed to the header tank, wherein the connection piece comprises:

region a) comprising a connecting region for the header tank;

region b) comprising a stop region formed by a continuous collar, wherein the continuous collar of the stop region has integrally formed thereon at least one first anti-twist retaining protrusion that projects radially beyond the diameter of the continuous collar;

region c) comprising a retaining region formed by a groove; and region d) comprising a sealing and centering region formed by a cylindrical part that merges into a conical part, said regions a)–d) adjoining one another in the direction of the longitudinal axis of the connection piece.

2. A connection piece as claimed in claim 1, wherein the continuous collar of the stop region comprises a double bead, and wherein one bead has integrally formed thereon said at least one first anti-twist retaining protrusion that projects radially beyond the diameter of the bead.

3. A connection piece as claimed in claim 2, wherein the anti-twist retaining protrusion comprises a tab.

4. A connection piece as claimed in claim 3, wherein a further anti-twist retaining tab is integrally formed on and extends radially beyond the widest diameter of the conical part, and is spaced axially from the first anti-twist retaining protrusion.

5. A connection piece as claimed in claim 3, comprising two tabs located diametrically opposite one another on the bead.

6. A connection piece as claimed in claim 5, further comprising a second set of two tabs located diametrically opposite one another on the widest diameter of the conical part and spaced axially from said continuous collar.

7. A connection piece as claimed in claim 5, wherein the tabs located opposite one another have different sizes.

8. A connection piece as claimed in claim 1, wherein said connection piece is produced by extrusion from a billet-like material blank.

9. A connection piece as claimed in claim 8, wherein said at least one anti-twist retaining protrusion comprises a web that runs axially and that extends in the axial direction from the continuous collar over the region of the groove.

10. A connection piece as claimed in claim 9, comprising two webs located diametrically opposite one another and having different widths.

11. A connection piece as claimed in claim 1, wherein said connection piece comprises a hard-brazable aluminum alloy.

12. A connection structure for a heat exchanger having a metallic header tank and adapted for accepting a hose coupled thereto, the connection structure comprising:

a metallic connection piece for a heat exchanger having a metallic header tank, the connection piece being capable of being brazed to the header tank, wherein the connection piece comprises:

region a) comprising a connecting region for the header tank;

region b) comprising a stop region formed by a continuous collar, wherein the stop region comprises a double bead, and wherein one bead has integrally formed thereon at least one anti-twist retaining protrusion that projects beyond the diameter of the bead;

region c) comprising a retaining region formed by a groove; and region d) comprising a sealing and centering region formed by a cylindrical part that merges into a conical part;

said regions a)–d) adjoining one another in the direction of the longitudinal axis of the connection piece;

a plastic sleeve placed axially over the connection piece;

a sealing ring contained between the cylindrical part of the sealing and centering region and the inside of the plastic sleeve; and a retaining strap positioned in the groove of the retaining region;

wherein the plastic sleeve comprises at least one axial groove for receiving the anti-twist retaining protrusion.

13. An all metallic heat exchanger adapted for accepting a hose coupled thereto, comprising:

a metallic header tank;

a connection piece brazed to the header tank, wherein the connection piece comprises:

region a) comprising a connecting region for the header tank;

region b) comprising a stop region formed by a continuous collar, wherein the stop region comprises a double bead, and wherein one bead has integrally formed thereon at least one anti-twist retaining protrusion that projects beyond the diameter of the bead;

region c) comprising a retaining region formed by a groove; and region d) comprising a sealing and centering region formed by a cylindrical part that merges into a conical part;

said regions a)–d) adjoining one another in the direction of the longitudinal axis of the connection piece;

a plastic sleeve placed axially over the connection piece;

a sealing ring contained between the cylindrical part of the sealing and centering region and the inside of the plastic sleeve; and a retaining strap positioned in the groove of the retaining region;

wherein the plastic sleeve comprises at least one axial groove for receiving the anti-twist retaining protrusion.

14. A heat exchanger as claimed in claim 13, wherein the anti-twist retaining protrusion comprises a tab.

15. A heat exchanger as claimed in claim 14, wherein a further anti-twist retaining tab is integrally formed on the widest diameter of the conical part.

16. A heat exchanger as claimed in claim 14, comprising two tabs located diametrically opposite one another on the bead.

17. A heat exchanger as claimed in claim 16, comprising two tabs located diametrically opposite one another on the widest diameter of the conical part.

18. A heat exchanger as claimed in claim 17, wherein the tabs located opposite one another have different sizes.

19. A connection structure for a heat exchanger having a metallic header tank and adapted for accepting a hose coupled thereto, the connection structure comprising:

a metallic connection piece for a heat exchanger having a metallic header tank, the connection piece being capable of being brazed to the header tank, wherein the connection piece comprises:

region a) comprising a connecting region for the header tank;

region b) comprising a stop region formed by a continuous collar, wherein the continuous collar of the stop has integrally formed thereon at least one anti-twist retaining protrusion that projects beyond the diameter of the continuous collar and wherein said at least one anti-twist retaining web runs axially and extends in the axial direction from the continuous collar over the region of the groove;

region c) comprising a retaining region formed by a groove; and region d) comprising a sealing and centering region formed by a cylindrical part that merges into a conical part;

said regions a)–d) adjoining one another in the direction of the longitudinal axis of the connection piece;

a plastic sleeve placed axially over the connection piece;

a sealing ring contained between the cylindrical part of the sealing and centering region and the inside of the plastic sleeve; and a retaining strap positioned in the groove of the retaining region;

wherein the plastic sleeve comprises at least one axial groove for receiving the anti-twist retaining protrusion.

20. An all metallic heat exchanger adapted for accepting a hose coupled thereto, comprising:

a metallic header tank;

a metallic connection piece brazed to the header tank, wherein the connection piece comprises:

region a) comprising a connecting region for the header tank;

region b) comprising a stop region formed by a continuous collar, wherein the continuous collar of the stop has integrally formed thereon at least one anti-twist retaining protrusion that projects beyond the diameter of the continuous collar and wherein said at least one anti-twist retaining web runs axially and extends in the axial direction from the continuous collar over the region of the groove;

region c) comprising a retaining region formed by a groove; and region d) comprising a sealing and centering region formed by a cylindrical part that merges into a conical part;

said regions a)–d) adjoining one another in the direction of the longitudinal axis of the connection piece;

a plastic sleeve placed axially over the connection piece;

a sealing ring contained between the cylindrical part of the sealing and centering region and the inside of the plastic sleeve; and a retaining strap positioned in the groove of the retaining region;

wherein the plastic sleeve comprises at least one axial groove for receiving the anti-twist retaining protrusion.

21. A heat exchanger as claimed in claim 20, wherein said connection piece is produced by extrusion from a billet-like material blank.

22. A heat exchanger as claimed in claim 20, comprising two of said retaining webs located diametrically opposite one another and having different widths.

\* \* \* \* \*